United States Patent
Mori et al.

(10) Patent No.: US 7,196,865 B2
(45) Date of Patent: Mar. 27, 2007

(54) RECORDING APPARATUS HAVING DISCOID RECORD MEDIUMS

(75) Inventors: Kazunori Mori, Kawasaki (JP); Isamu Tomita, Kawasaki (JP); Tatsuhiko Kosugi, Kawasaki (JP); Yoshiyuki Kagami, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 33 days.

(21) Appl. No.: 10/691,336

(22) Filed: Oct. 22, 2003

(65) Prior Publication Data

US 2005/0088775 A1  Apr. 28, 2005

(51) Int. Cl.
*G11B 5/596* (2006.01)
(52) U.S. Cl. .............. 360/77.07; 360/77.08; 360/61; 360/77.04
(58) Field of Classification Search ............. 360/69, 360/75, 77.04, 77.01, 77.02, 77.07, 77.08
See application file for complete search history.

(56) References Cited

U.S. PATENT DOCUMENTS

| | | | | |
|---|---|---|---|---|
| 6,097,565 A | * | 8/2000 | Sri-Jayantha et al. | 360/78.09 |
| 6,128,153 A | | 10/2000 | Hasegawa et al. | 360/77.08 |
| 6,496,322 B1 | | 12/2002 | Hasegawa et al. | 360/77.08 |
| 6,611,396 B1 | * | 8/2003 | Kermiche et al. | 360/77.04 |

FOREIGN PATENT DOCUMENTS

JP  9-330571  12/1997

* cited by examiner

*Primary Examiner*—Andrew L. Sniezek
(74) *Attorney, Agent, or Firm*—Greer, Burns & Crain, Ltd.

(57) ABSTRACT

A recording apparatus capable of securely reading out data for causing a head to follow along circular tracks set virtually. Therefore, on-track control along the virtual tracks is possible by the conversion data on the discoid record medium even when, for example, the printed circuit board in a recording apparatus has been replaced.

10 Claims, 10 Drawing Sheets

FIG. 4

| HEAD NUMBER 41 | CIRCULAR ORBIT BASED ON SERVO INFORMATION 42 | VIRTUAL CIRCULAR ORBIT 43 |
|---|---|---|
| 1 | (rtrk1, rsct1) | (vtrk1, vsct1) |
| 1 | (rtrk2, rsct2) | (vtrk2, vsct2) |
| 2 | (rtrk3, rsct3) | (vtrk3, vsct3) |
| 2 | (rtrk4, rsct4) | (vtrk4, vsct4) |
| ⋮ | ⋮ | ⋮ |
| n | (rtrkN, rsctN) | (vtrkN, vsctN) |

RECORDING APPARATUS HAVING DISCOID RECORD MEDIUMS

BACKGROUND OF THE INVENTION

1. Field of the invention

The present invention relates to a recording apparatus having discoid record mediums and more specifically to a recording apparatus executing on-track control of heads based on servo information recorded on the record mediums.

2. Description of the Related Art

In recording apparatuses such as a Hard Disk Drive (hereinafter, referred to as "HDD") having discoid record mediums, the position of a head is controlled according to the servo information written in storage mediums such as disks. A head is a device for detecting magnetic signals recorded on disks and for recording magnetic signals on disks. Write-in of information and read-out of information recorded on a disk is enabled by sliding the head on the disk. The servo information is recorded in a servo pattern written radially on the surface of a disk.

FIG. 1 illustrates the state of the surface of a disk inside an HDD. A disk 2 is a discoid record medium rotated by a spindle motor 1 having a cylindrical shape. The central shaft of the spindle motor 1 is herein referred to as "rotation center".

A servo pattern 5 including servo information is written radially on the surface of the disk 2. FIG. 1 is depicted assuming that the center of the servo pattern 5 and the rotation center are at the same position.

Tracks 3 in the form of concentric circular tracks are defined in the disk 2 such that points having the same distance from the center of the servo pattern 5 written radially have a same track number. Each track 3 has a predetermined width. Each track 3 is further divided into a plurality of sectors 4 and each sector 4 is managed with a sector number.

Since reading and writing of data are executed sector-by-sector, a head 6 is controlled such that it follows on a same track, and detects signals recorded in sectors 4. The servo information contained in the servo pattern 5 includes a track number and a sector number which indicate the part where the radially written servo pattern 5 intersects tracks, and a signal used for determining whether the head 6 are shifted from a track center 8 or not.

In order to control the head 6 such that it follows a same track, when the head passes the servo pattern 5, the servo information is read out. Whether or not the track number contained in the servo information is the track to follow and whether or not the head is shifted from the center 8 of the track are determined. When the head is not shifted from the center of the track to follow, the state is referred to as "the head is on-track" and, when it is shifted from the center of the track to follow, the state is referred to as "the head is off-track".

The head 6 is supported by a head arm 7 and the head arm 7 is connected to a voice coil motor 9. The head 6 can move over a predetermined area on the surface of the disk 2 and read-in and write-out of data on the disk 2 can be executed by virtue of driving the head arm by the voice coil motor 9 and rotations of the disk 2.

In order to write the above-described servo information onto the disk 2, there are two (2) methods: one is a method in which, after the disk 2 has been installed into the HDD, a program for writing the servo information is started up and the servo pattern 5 is written on the surface of the disk with the head 6; and the other is a method in which, after the servo pattern 5 has been written on the surface of the disk with a dedicated device for writing the servo information (hereinafter, referred to as "STW (=Servo Track Writer)"), the disk 2 is installed into the HDD.

In either method, due to the vibration of the disk 2 or the vibration of the head 6 generated when the disk 2 is rotated during the write-in of the servo information, the tracks 3 defined by the servo information actually written may not be circles which center is the rotation center of the disk 2 and the tracks may windle. In the latter method, due to the installation error generated when the disk 2 is installed into the HDD after the servo pattern 5 has been written by the STW, the center of the servo pattern 5 recorded radially and the rotation center of the disk 2 do not coincide with each other and the centers are shifted from each other. Therefore, each track 3 defined by the servo information actually written may also not be a circle having its center at the rotation center of the disk 2.

The heads 6 are disposed such that they sandwich the disk 2 that is rotating. Since the number of the heads capable of being controlled at one time is one (1), the head to be controlled may be switched from the head on the face to the head on the back in order to read and write data on the back surface of the disk 2. In the case where a plurality of disks 2 are present in the HDD, the head to be controlled may be switched to one of the heads disposed such that they sandwich another disk 2.

In the case where each track 3 is not a circle having its center at the rotation center of the disk 2, the head position stabilizing time at the time when the head 6 has been switched becomes considerably long. This is because the track number does not differ between before and after the switching of the head if each track 3 is a circle having its center at the rotation center of the disk 2, however, the track number differs between before and after the switching of the head if each track 3 is not a circle having its center at the rotation center of the disk 2 and, therefore, the head is controlled, after the switching, to return to the track having the same track number as the track number before the switching.

In order to solve this task, a method has been proposed for causing the head 6 to follow virtual circles around the rotation center of the disk 2, not that the head 6 is controlled according to the actually written servo information (see Patent Document 1). In Patent Document 1, virtual concentric circular orbits around the rotation center of the disk 2 are set and the virtual circular orbits are used as the virtual tracks. Data is read and written along the virtual tracks using the correspondence data to correspond the tracks defined by the servo information to the virtual tracks.

However, the place to store this correspondence data is the problem. In the conventional technique, the correspondence data is recorded in each sector, otherwise, a conversion table clarifying the correspondence data for each sector is recorded only in a non-volatile memory such as a PROM (Programmable Read Only Memory).

The tracks defined by the servo information cross the virtual tracks and they interfere with each other. Therefore, the above-described correspondence data is overwritten by data written along the virtual tracks. As a result, the correspondence data can not be read out and the control along the virtual tracks may not be able to be executed. Furthermore, in the case where the above-described conversion table is stored only in the non-volatile memory such as a PROM, a failure of the non-volatile memory having occurred after shipment can not be coped with and, in this case, the control along the virtual track also can not be executed.

In the conventional technique, in any of the above cases, the correspondence data or the conversion table is not stored at the place where it can be securely read out and, when any of the above data can not be read out, a task that the head control along the virtual track can not be executed has arisen.

(Patent Document 1) Japanese Patent Application Laid-Open (Kokai) Pub. No. H9-330571

SUMMARY OF THE INVENTION

The object of the invention is to provide a recording apparatus capable of securely reading out data for causing a head to follow along circular orbits set virtually when the apparatus has been started up. Furthermore, it is desirable that correspondence data is not recorded as the servo information for each sector, however, it is recorded as a conversion table clarifying the correspondence data for each sector.

In one embodiment, there is provided a recording apparatus having a discoid record medium; a head for writing or reading information to/from the discoid record medium; a rotation shaft for rotating the discoid record medium; and a control unit for controlling the position of the head, the discoid record medium having thereon recorded in advance servo information defining the position of the head on the discoid record medium, the control unit controlling the head based on position conversion information for allowing the position of the head located by the servo information to correspond to a position on concentric orbits around the rotation shaft, wherein the control unit further stores the position conversion information in a predetermined area on the concentric orbits defined by the servo information, determines whether or not the position conversion information is stored in a predetermined area on the concentric orbits defined by the servo information at the start-up of the recording apparatus and, when the position conversion information is stored in the predetermined area on the concentric orbits defined by the servo information, reads out the position conversion information and controls the head based on the read out position conversion information.

The above object can also be attained by providing recording apparatus further having a memory unit in which the position conversion information is stored, and wherein the control unit determines whether or not a first position conversion information stored in the memory unit can be read out at the start-up and, when the first position conversion information can be read out, controls the head based on the read out first position conversion information and, when the first position conversion information can not be read out, first, reads out a second position conversion information stored in a predetermined area on concentric orbits defined by the servo information by controlling the head along the concentric orbits defined by the servo information, then, selects the control such that the head is controlled based on the read out second position conversion information.

The recording apparatus can have another feature, wherein the predetermined area on the concentric orbits defined by the servo information, in which the second position conversion information is stored, is an area on the concentric orbits around the rotation shaft, from which information can be read out even when the information has been written along the concentric orbits around the rotation shaft.

In another aspect of the invention, the concentric orbits defined by the servo information are further circumferentially divided into a plurality of sectors, and the predetermined area of the orbits, in which the second position conversion information is stored, is a part of the plurality of sectors.

In yet another aspect of the invention, the recording apparatus further has a memory unit in which the position conversion information is stored, wherein the control unit stores the position conversion information in the predetermined area on the concentric orbits around the rotation shaft, and wherein the control unit determines whether or not the first position conversion information stored in the memory unit can be read out at the start-up and, when the first position conversion information can be read out, reads out the second position conversion information stored in the predetermined area on the concentric orbits around the rotation shaft by controlling the head based on the read out first position conversion information, compares the first position conversion information and the second position conversion information with each other, and when they do not coincide with each other as a result of the comparison, first, switches the control such that the head is controlled along the concentric orbits defined by the servo information and reads out a third position conversion information stored in a predetermined area on the concentric orbits defined by the servo information and, then, switches again the control such that the head is controlled based on the read out third position conversion information.

The recording apparatus can have another feature, wherein the predetermined area on the concentric orbits defined by the servo information on which the third position conversion information is stored is an area on the concentric orbits determined by the servo information, from which information can be read out even when the information has been written along the concentric orbits around the rotation center.

In still another aspect of the invention, the concentric orbits defined by the servo information are further circumferentially divided into a plurality of sectors, and the predetermined area of the concentric orbits defined by the servo information, on which the third position conversion information is stored, is a part of the plurality of sectors.

The above object can also be accomplished by a method of starting up a recording apparatus having a discoid record medium on which is recorded servo information locating the position of a head, wherein position conversion information for allowing the position located by the servo information to correspond to a position on concentric orbits around a rotation shaft for causing the discoid record medium to rotate, is stored in advance in a predetermined area on the concentric orbits defined by the servo information, wherein whether or not the position conversion information is stored in the predetermined area on the concentric orbits defined by the servo information is determined at the start-up of the recording apparatus, wherein when the position conversion information is stored in the predetermined area on the concentric orbits defined by the servo information, the position conversion information is read out, and wherein the head is controlled based on the read out position conversion information.

The above method can have another feature, wherein the recording apparatus further has a memory unit in which the position conversion information is stored, wherein whether or not a first position conversion information stored in the memory unit can be read out is determined, wherein when the first position conversion information can be read out, the head is controlled based on the read out first position conversion information, and wherein when the first position conversion information can not be read out, first, a second position conversion information stored in a predetermined area on concentric orbits defined by the servo information is read out by controlling the head along the concentric orbits defined by the servo information, then, the control is switched such that the head is controlled based on the read out second position conversion information.

The above method of starting up a recording apparatus can have still another feature, wherein the recording apparatus further has a memory unit in which the position conversion information is stored, wherein the position conversion information is further stored in advance in the predetermined area on the concentric orbits around the rotation shaft, wherein whether or not the first position conversion information stored in the memory unit can be read out is determined at the start-up of the recording apparatus, wherein when the first position conversion information can be read out, the head is controlled based on the read out first position conversion information, wherein the second position conversion information stored in the predetermined area on the concentric orbits around the rotation shaft is read out, wherein the first position conversion information and the second position conversion information is compared with each other, wherein when they do not coincide with each other as a result of the comparison, first, the third position conversion information stored in a predetermined area on the concentric orbits defined by the servo information is read out by switching the control such that the head is controlled along the concentric orbits defined by the servo information, and wherein the control is switched again such that the head is controlled based on the read out third position conversion information.

BRIEF DESCRIPTION OF THE DRAWINGS

FIG. 4 is a table listing an exemplary structure of virtual circular orbit conversion data;

DESCRIPTION OF THE PREFERRED EMBODIMENTS

Figure 1:
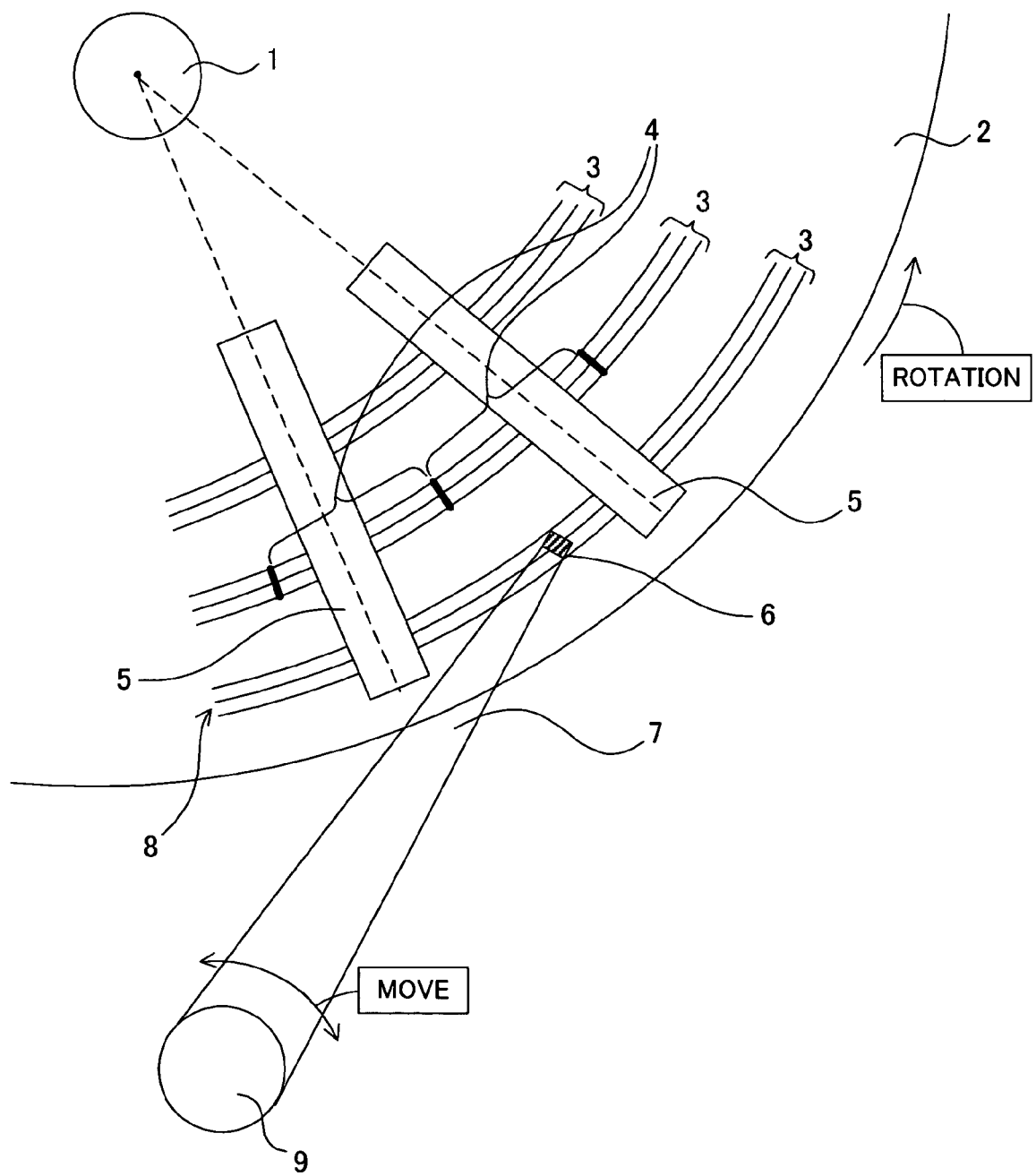
FIG. 1 illustrates a state of a surface of a disk inside a recording apparatus.

Embodiments of the invention will be described referring to the drawings. However, the technical scope of the invention is not limited to the embodiments.

In a recording apparatus of an embodiment of the invention, the center of a servo pattern and the rotation center are shifted and virtual circular orbit conversion data for relating tracks defined by the servo pattern to virtual tracks having its center at the rotation center has been stored in advance in an area which is a recording area on a disk and is the area capable of being read out even when recording of data along the virtual tracks has been executed.

By reading out the virtual circular orbit conversion data when the recording apparatus has been started up, thereafter, a head is controlled along the virtual tracks, data is recorded on the virtual tracks and the recorded data is read out.

Figure 2:
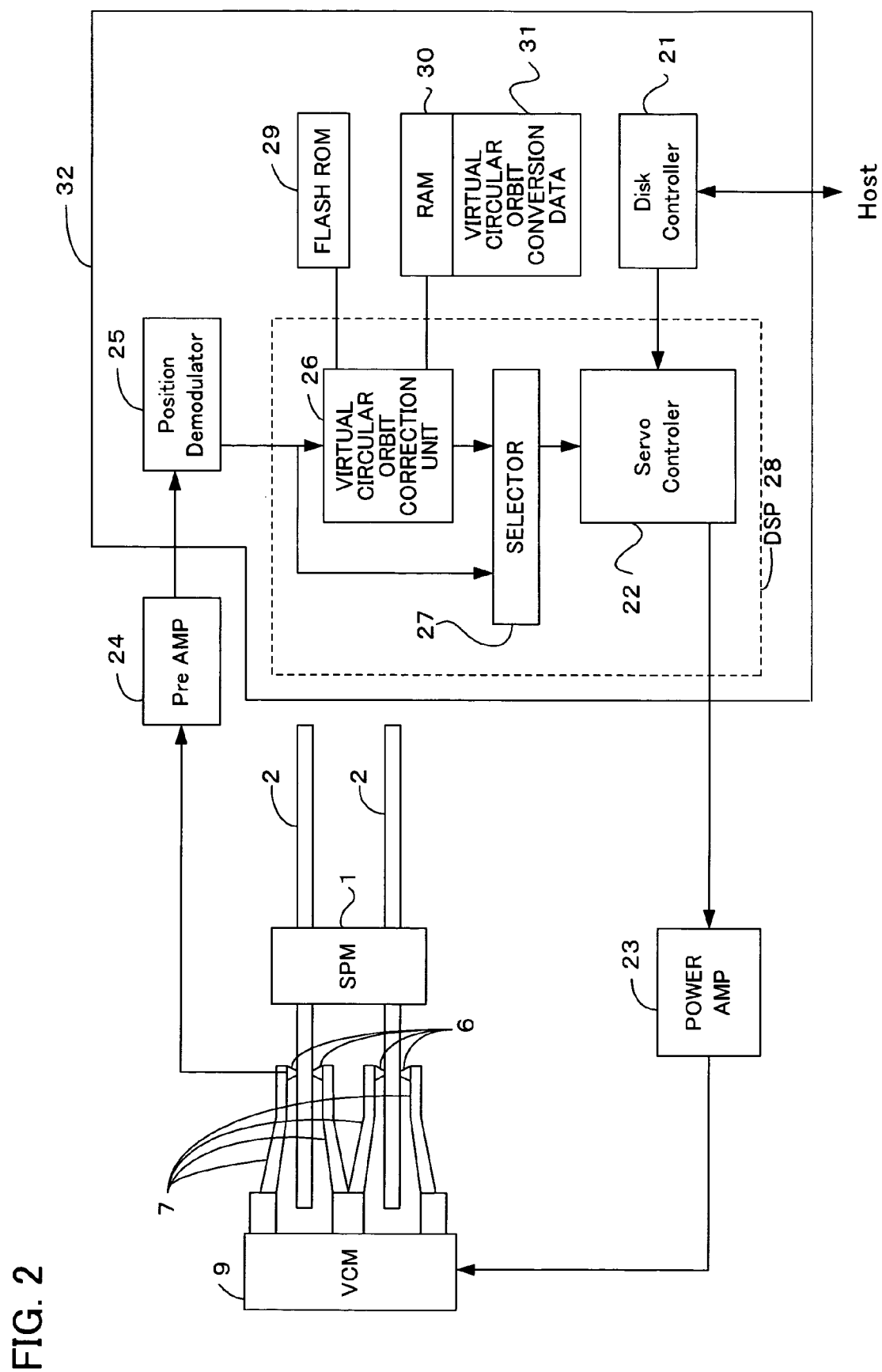
FIG. 2 is a block diagram of a recording apparatus of an embodiment of the invention.

FIG. 2 is a block diagram of a recording apparatus of an embodiment of the invention. A disk controller 21 provides an interface for connecting with the exterior of the recording apparatus and functions as a controller unit for controlling a servo controller etc. described later. For example, there are types of interfaces such as IDE (Integrated Drive Electronics) and SCSI (Small Computer System Interface). The recording apparatus is connected to a host being the issuer of orders such as write-in and read-out of data through this interface.

The disk controller 21 having received an order from the host outputs to a servo controller 22 a drive instruction order of the head 6 to a targeted track. The drive instruction outputted from the servo controller 22 is converted into a electrical current for controlling the Voice Coil Motor (hereinafter, referred to as "VCM") 9 by a power amplifier 23 on the way and the current flows in the VCM 9. By the variation of the current flowing in the VCM 9, the head arm 7 integrated into the VCM 9 and the head 6 installed at the tip of the head arm 7 move relative to the disk 2 in the direction along the radius.

The disk 2 is a discoid record medium with magnetic substance vapor-deposited on its surface and information is recorded thereon using a magnetic field. Since the disk 2 is rotated by a Spindle Motor (hereinafter, referred to as "SPM") 1, the head 6 passes over a servo pattern (not shown) written radially on the disk 2. Since the position of the head can be located by the servo information contained in the servo pattern, a signal read out when the head passes over the servo pattern is amplified by a pre-amplifier 24 and demodulated by a position demodulation unit 25 to a position of the head 6 on the disk in the direction along the radius.

When this demodulated position is inputted into the servo controller 22 and the head 6 is caused to follow the demodulated position, it is possible to cause the head 6 to follow a track defined by the servo pattern written on the disk 2. When the demodulated position is not inputted into the servo controller 22 as it is but it is inputted into a virtual circular orbit correction unit 26, the result of the correction is inputted into the servo controller 22 and the head 6 is caused to follow the position obtained as the correction result, it is possible to cause the head 6 to follow a track set virtually. That is, the servo controller 22 functions as a head driving unit for varying the position of the head.

A selector 27 switches from causing the head to follow the track defined by the servo pattern to causing the head to follow the track set virtually and vice versa by switching the signal to be inputted to the servo controller 22. This switching can be executed arbitrarily. A flash ROM 29 functions as a storage unit in which programs for the control and various data are stored. The contents of the flash ROM 29 are not lost even when the power is turned off.

A RAM 30 temporarily stores the calculation result etc. necessary for the control. The contents of the RAM 30 are lost when the power is turned off. A virtual circular orbit conversion data 31 is the data used for correction for causing the head to follow the virtually set tracks and is the table-type data for converting the tracks defined by the actually written servo pattern (real pattern) into the virtual tracks set virtually such that each virtual track becomes a circle having its center at the rotation center.

The virtual circular orbit conversion data 31 is determined for each disk based on the amount of shift between the center of the servo pattern measured at the time of manufacture and the rotation center and, in the embodiment of the invention, is stored in the disk 2. When the recording apparatus is started up, the virtual circular orbit conversion data 31 is read out and is copied into the Random Access Memory (hereinafter, referred to as "RAM") 30. The virtual circular orbit conversion data 31 copied into the RAM 30 is used while the recording apparatus is operating.

In FIG. 2, the position demodulation unit 26, the selector 27 and the servo controller 22 is included in a Digital Signal Processor (hereinafter, referred to as "DSP") 28. The DSP 28 and RAM 30 are included in a signal processing board (printed circuit board) 32. When any of the devices included in the printed circuit board 32 (for example, DSP 28) has caused a failure, the entire printed circuit board 32 is replaced.

Figure 3:
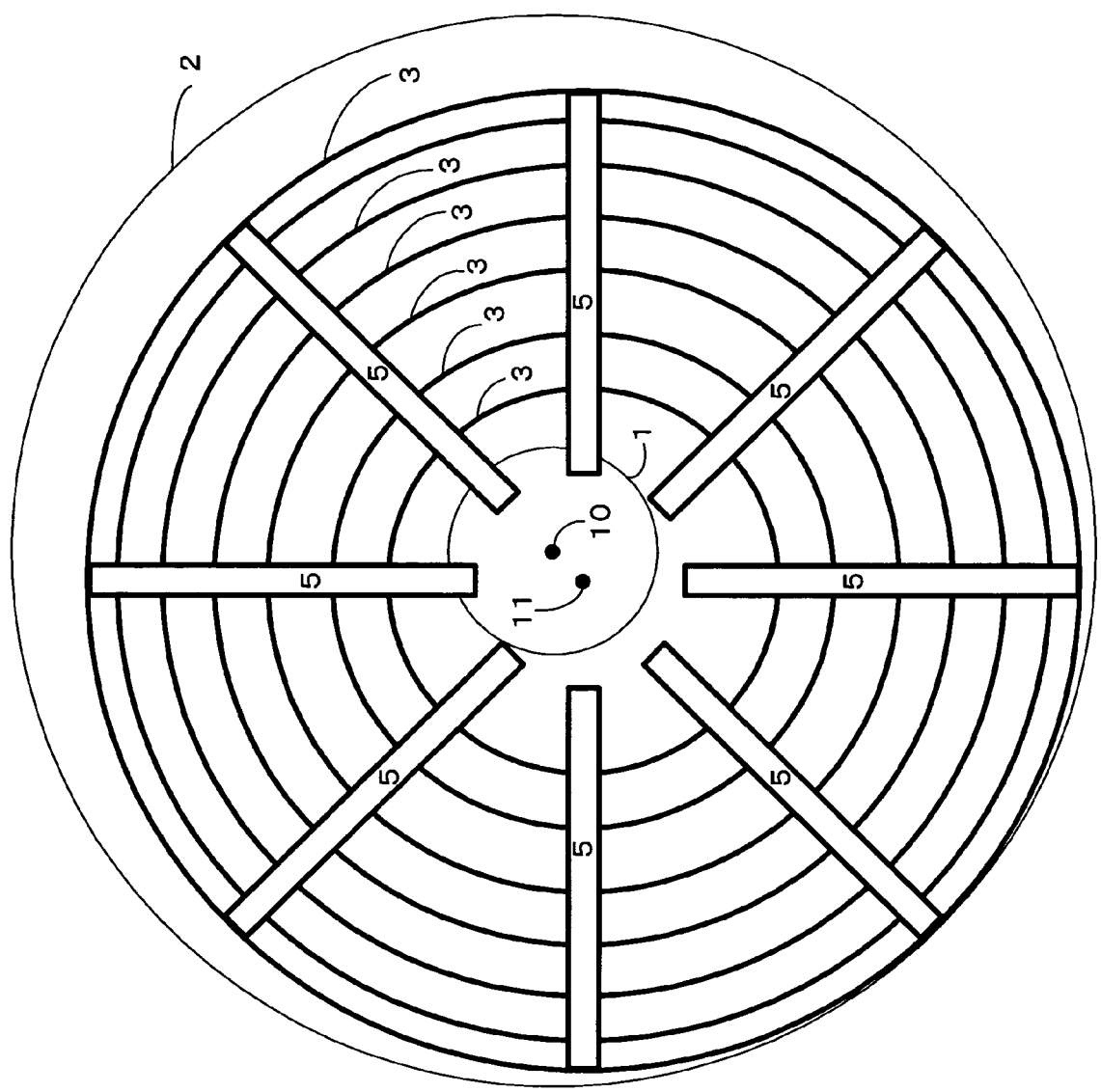
FIG. 3 shows an example of a disk for which the center of servo pattern and the rotation center of the disk do not coincide with each other.

FIG. 3 shows an example of a disk for which the center of the servo pattern and the rotation center of the disk 2 do not coincide with each other. For example, due to the installation error generated when the disk 2 is installed into the HDD after the servo pattern has been written by the STW, the state as shown in FIG. 3 occurs.

The center of the spindle motor 1, i.e., the rotation center 10 and the center 11 of the servo pattern 5 written radially on the surface of disk 2 are shifted to each other and decentered. So, each track 3 defined by the servo pattern written actually is not a concentric circular orbit having its center at the rotation center 10.

Though the amount of the shifting is emphasized in FIG. 3, the actual amount of the shifting is only several micro meters. However, the stabilizing time of the head is increased considerably by the shifting of several micro meters. Furthermore, though only several tracks are depicted in FIG. 3 for simplification, this is for explanation and there actually are many tracks.

FIG. 4 is a table listing an exemplary structure of the virtual circular orbit conversion data for relating the tracks defined by the servo pattern written actually on the disk, to the concentric virtual tracks which center is the rotation center. In FIG. 4, information for converting the servo information read out when the head passes over the servo pattern into the data for concentric virtual circular orbits around the rotation center is stored for each head.

Therefore, in the virtual circular orbit conversion data in FIG. 4, a head number 41, a combination 42 of a track number and a sector number based on the servo information, and a combination 43 of a track number and a sector number of a virtual track are stored for each head. For example, it can be seen that, for a head having a number "1", the position having a track number "rtrk1" and a sector number "rsct1" corresponds to the position on the virtual track, having a track number "vtrk1" and a sector number "vsct1". Then, the position demodulation unit 26 controls the head 6 by substituting the position information of the head on a virtual track converted by the virtual circular orbit conversion data 31 stored in the RAM 30, for the position information of the head 6 read out based on the actual servo information. Thereby, the control of the head 6 is executed maintaining on-track along the virtual tracks.

The virtual circular orbit conversion data is calculated by measuring how much the center of the written servo pattern is shifted from the rotation center after a servo pattern writing to a disk followed by the disk being installed in a HDD, or after a disk being installed in a HDD followed by a servo pattern-writing to the disk. For example, when the amount of the shift of the center has been measured, the calculation for obtaining the correspondence table to create the virtual tracks is possible by applying a translatory displacement to the track defined by the servo pattern such that the servo pattern is concentric circles around the rotation center.

Figure 5:
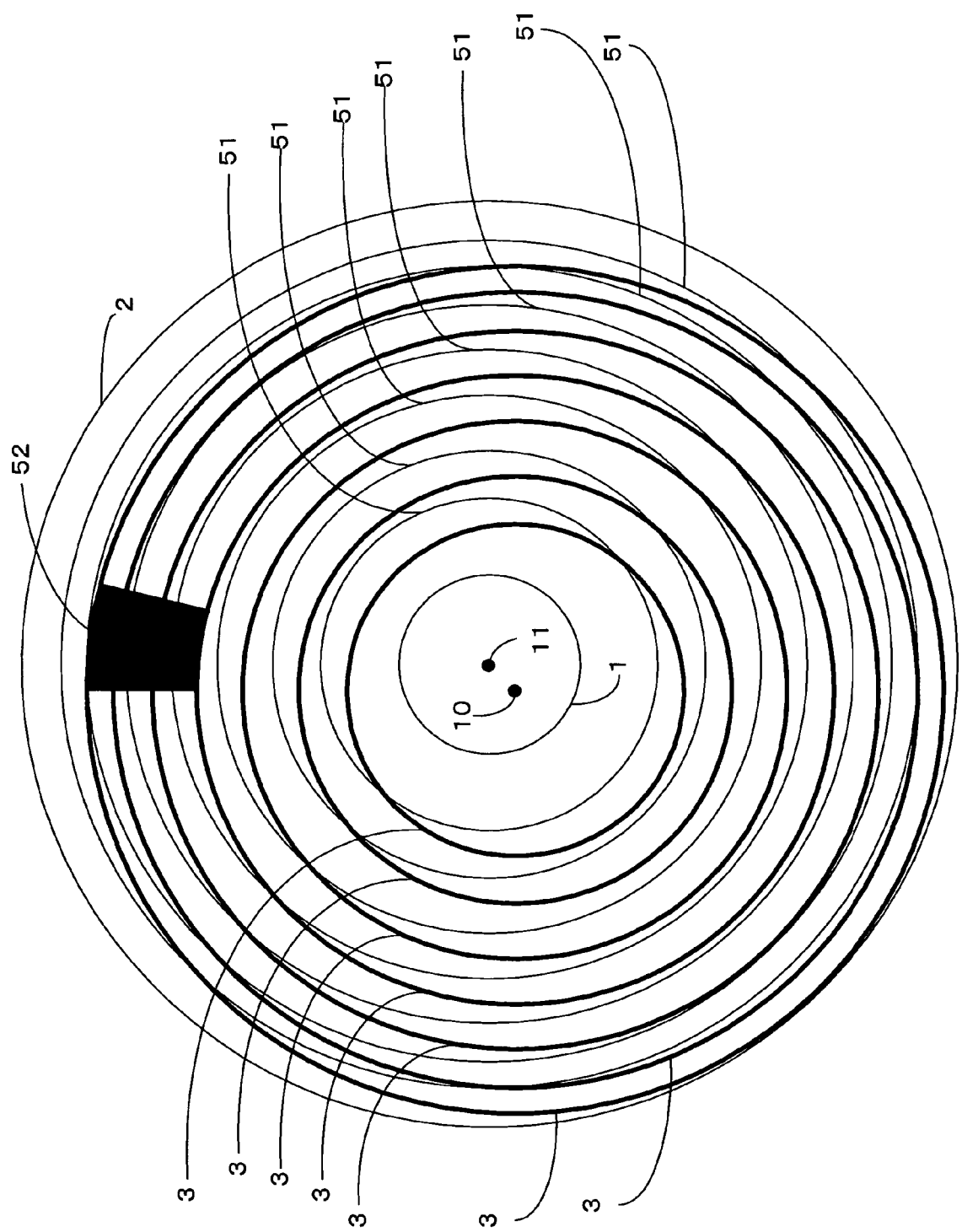
FIG. 5 shows an example of actual tracks and virtual tracks.

FIG. 5 shows an example of tracks before being converted by the virtual circular orbit correction data shown in FIG. 4 (actual tracks) and the virtual tracks after conversion. The virtual tracks 51 are concentric circles around the rotation center 10.

Therefore, in FIG. 2, when the selector 27 selects an alternative such that a signal from the position correction unit 26 is inputted to the servo controller 22, the head 6 is controlled such that it follows the virtual track 51 shown in FIG. 5, by using the virtual circular orbit conversion data shown in FIG. 4. An area 52 denotes a specific sector on the actual tracks (used in the explanation for FIG. 7 described later).

FIG. 5 shows virtual tracks set by applying a translatory displacement by the amount of shifting between the center 11 of the servo pattern and the rotation center 10 to the tracks 3 defined by the servo pattern actually written. However, it is possible to relate the tracks 3 to the virtual tracks 41 by defining a new correspondence relationship.

Next, a storage place of the virtual circular orbit conversion data in the recording apparatus of the embodiment of the invention will be described. In the embodiment of the invention, the virtual circular orbit conversion data shown in FIG. 4 is stored in the disk 2 in advance.

It is necessary for the virtual circular orbit conversion data stored in the disk 2 to be stored at least in the actual tracks. At the stage at which the virtual circular orbit conversion data has not been read out, it is impossible to read out the data recorded in the virtual tracks. Therefore, it is necessary for the virtual circular orbit conversion data stored in the disk 2 to be recorded on the actual track defined by the servo information actually written, not on the virtual tracks.

As another requirement, it is necessary for the virtual circular orbit conversion data stored in the disk 2 to be recorded at a place where the data can not be overwritten even when new data is written along the virtual tracks. This is because, once the virtual circular orbit conversion data has been read out, new data is subsequently written on the virtual tracks and, in the case where the virtual tracks and the actual tracks cross each other as shown in FIG. 5, the data on the actual tracks is overwritten by the data to be written on the virtual tracks.

Therefore, it is necessary for the virtual circular orbit conversion data stored in the disk 2 to be recorded at a place where the data can not be overwritten even when data is written on the actual tracks along the virtual tracks.

Figure 6:
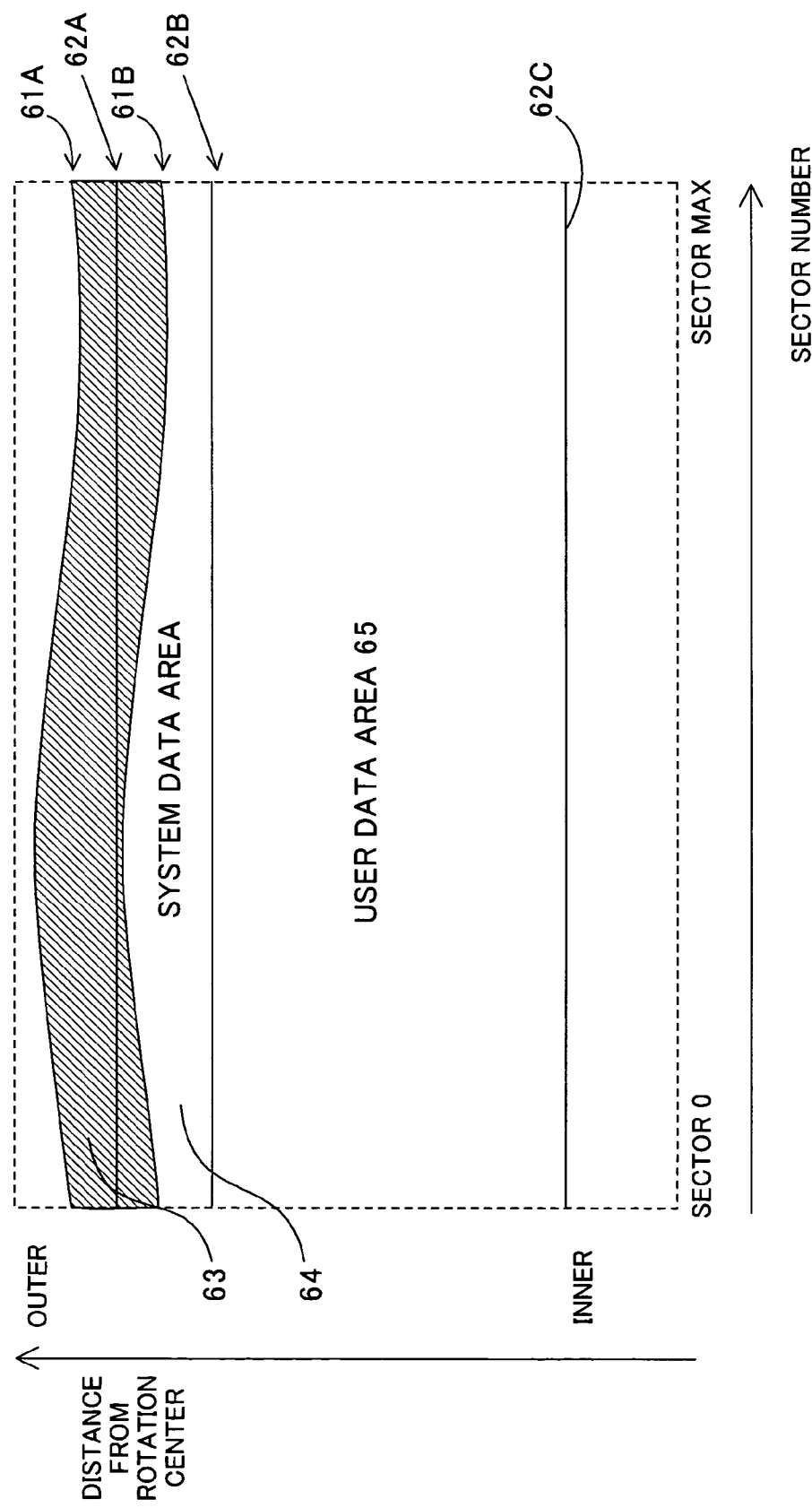
FIG. 6 shows an example of storage of the virtual circular orbit conversion data.

FIG. 6 shows an example of storage of the virtual circular orbit conversion data meeting the above conditions. The axis of ordinate in FIG. 6 represents the distance from the rotation center, i.e., the distance in the direction of radius. When the distance from the rotation center is short, it means to be inner (on inner side) being close to the spindle motor and, when the distance is long, it means to be outer (on outer side) being close to the outer edge of the disk.

The axis of abscissa represents a sector number, i.e., the distance in the direction along the circumference from a point on the circumference. In other words, it can also be regarded as an angle starting from zero (0) degree. The end point (sector number MAX) of the axis of abscissa with a starting point of sector number 0 runs along the circumference for approximately whole length of it, and the sector number 0 and the last sector number (sector number MAX) adjoin sandwiching a predetermined spacing. When dividing into sectors to secure a predetermined area, one whole track around can not always be allocated to sectors.

In FIG. 6, tracks 61 defined being based on the servo pattern is a curve since the distance from the rotation center is not constant. On the other hand, virtual tracks 62 set in concentric circles around the rotation center is represented as a straight line since the distance from the rotation center is constant.

In FIG. 6, an area between the most outer virtual track 62A and a virtual track 62B is secured as a system information area 64. The system information area 64 is distinguished from a user data area described as follows and can not be overwritten by data to be written in the user data area.

Such parameter information relating to a recording apparatus as predetermined values of the current to be applied to the head etc., for example, are stored in the system information area 64 as system information. The system information is also determined when the apparatus is manufactured, similarly to the virtual circular orbit conversion data, and is stored in the disk 2 (the system information area 64). System information is read out and used when the recording apparatus is initialized.

The area between the virtual track 62B and the most inner virtual track 62C is secured as a user data area 65. The user data area 65 is an area to which data is written, or from which data is read out, in response to a request from a user of a host connected with the recording apparatus.

In the embodiment of the invention, a plurality of pieces of the virtual circular orbit conversion data are stored in a plurality of the actual tracks present in the area sandwiched by an actual track 61A and an actual track 61B shown in FIG. 6. The actual track 61A is an actual track that is present outer than the virtual track 62A and inner than the most outer actual track. The actual track 61B is an arbitrary actual track present inner than the most outer virtual track 62A.

First, the plurality of pieces of the virtual circular orbit conversion data are stored in an area sandwiched by the actual track 61A and the actual track 61B and, thereafter, the system information is recorded in the system information area 64 along the virtual tracks. Thereby, any of the plurality of pieces of the virtual circular orbit conversion data stored in the area sandwiched by the actual track 61A and the virtual track 62A is/are always present. Furthermore, since it is on the actual tracks, it is possible to read out the virtual circular orbit conversion data by controlling according to the actual servo information even when reading out the virtual circular orbit conversion data from the flash ROM has been failed.

The size of the virtual circular orbit conversion data shown in FIG. 4 depends on the number of heads, the number of tracks, the number of sectors and the number of disks, however, it is at most several kilobytes to several megabytes. Since recording apparatuses currently have a capacity easily exceeding several tens gigabytes, it is possible to store the plurality of pieces of the virtual circular orbit conversion data shown in FIG. 4 in the area sandwiched by the actual track 61A and the actual track 61B. Furthermore, it is also possible to record the virtual circular orbit conversion data in specific sectors of the actual tracks.

Figure 7:
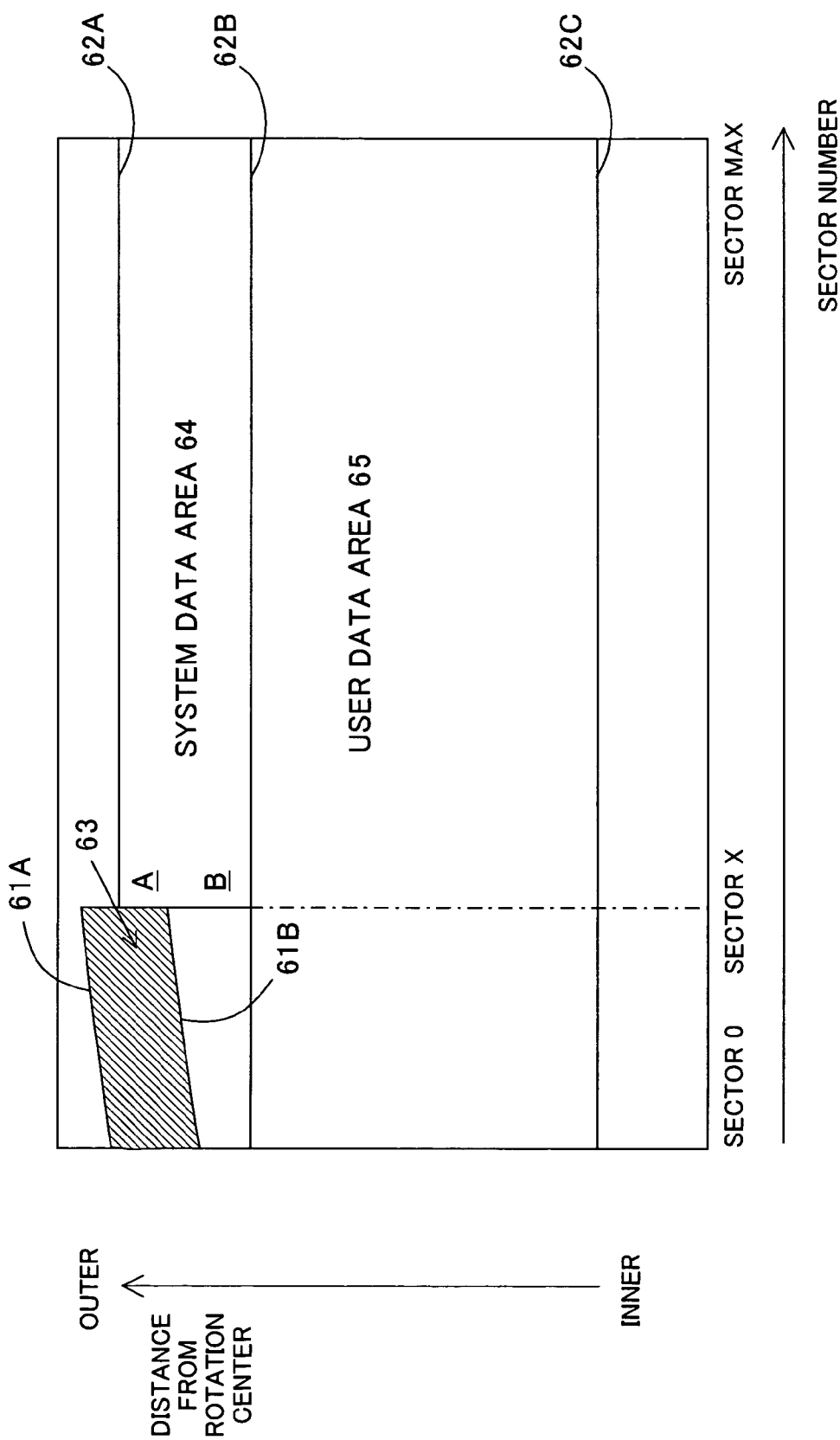
FIG. 7 shows a variation of the storage shown in FIG. 6.

FIG. 7 shows a variation of the storage shown in FIG. 6, in which the virtual circular orbit conversion data is stored in specific sectors of actual tracks. In FIG. 7, first, a plurality of actual tracks are designated and a plurality of pieces of the virtual circular orbit conversion data are stored in specific sectors of the designated actual tracks. When the specific sectors are defined as shown in FIG. 7, the area 52 having a shape of trapezoid shown in FIG. 5 is secured on the disk.

Next, which area on the virtual track corresponds to this trapezoidal area 52 is calculated with the virtual circular orbit conversion data and the use of the area obtained by the calculation is prohibited as a defect area on the virtual tracks. When information relating to the defect area has been added to the system information, no data can be written in the defect area even if the head is controlled along the virtual tracks.

In this manner, similarly to the case shown in FIG. 6, it is possible to store the plurality of pieces of the virtual circular orbit conversion data in the specific sector as shown in FIG. 7 meeting the condition for not to be overwritten even when head control on the actual track and along the virtual track is executed.

Next, processes at the start-up of a recording apparatus in the embodiment of the invention will be described.

Figure 8:
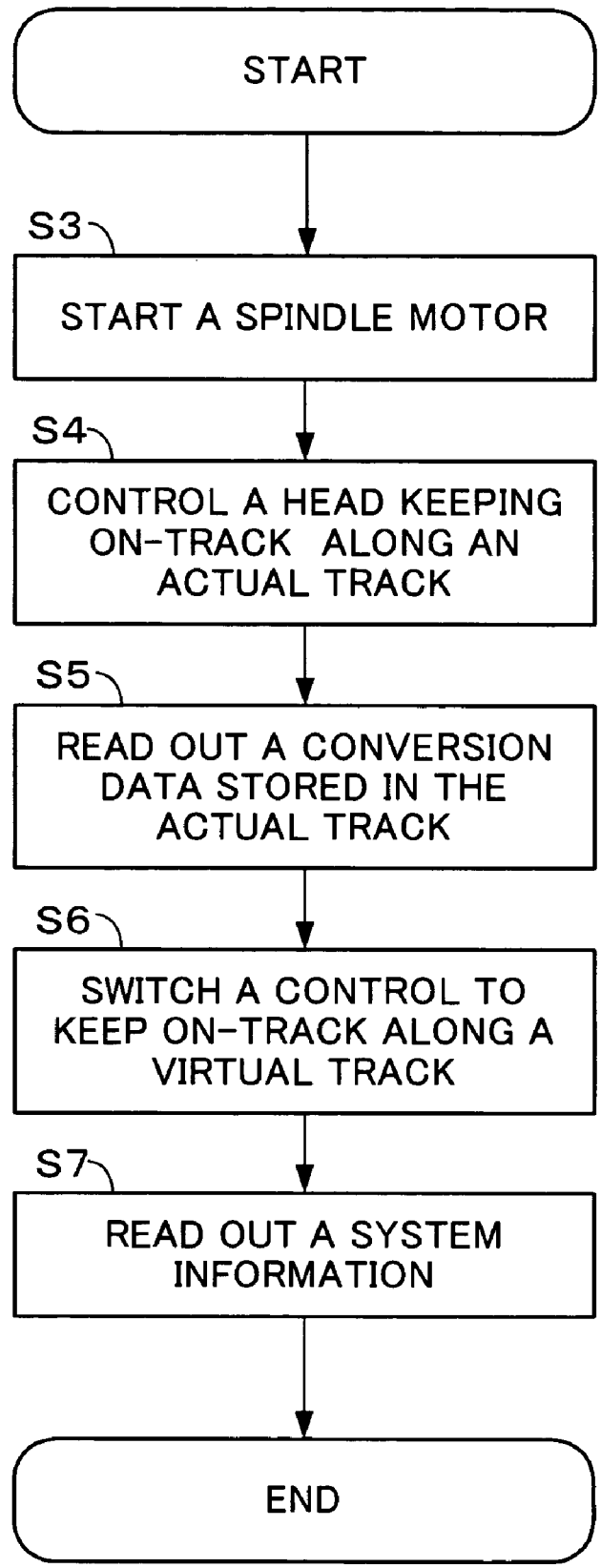
FIG. 8 is a flow chart illustrating processes at a start-up of a recording apparatus of a first embodiment of the invention.

FIG. 8 is a flow chart illustrating processes at the start-up of a recording apparatus of the embodiment of the invention. The virtual circular orbit conversion data is stored in the disk in advance.

First, the rotation of the spindle motor is started (S3). Then, the head is controlled along an actual track (S4). In step S4, the selector 27 is switched such that a signal from the position demodulation unit 25 is directly inputted into the servo controller 22.

Then, the virtual circular orbit conversion data stored in the actual tracks is read out (S5). For example, the virtual circular orbit conversion data stored in the actual tracks has been stored in a place where the data can not be overwritten even if new data is written there by executing on-track control along the virtual tracks as in FIG. 6 and FIG. 7. Therefore, the conversion data can be securely read out in Step S5. The read out virtual circular orbit conversion data is copied to RAM 30.

Then, the control is switched by the selector 27 such that the head is on-track controlled based on the virtual circular orbit conversion data read out in Step S5 (S6). In Step S6, the selector 27 is switched such that a signal from the virtual circular orbit correction unit 26 is inputted into the servo controller 22. The virtual circular orbit correction unit 26 converts information inputted from the position modulation unit 25 into information of the position on the virtual tracks with the virtual circular orbit conversion data copied in RAM 30, and inputs to the servo controller 22 an instruction that the head should be on-track to the virtual tracks.

Since it is possible to read and write the data on the virtual tracks due to the processes in Step S6, the system information stored in the system data area is read out and the recording apparatus is initialized (S7) and the processes at the start-up have ended. Then, initialization is executed referring to para meter information and defect information recorded in the system information.

By the start-up processes shown in FIG. 8, it is possible to read out securely the virtual circular orbit conversion data and to cause the head to follow along the virtual tracks. The virtual circular conversion data can not be read out caused by that the any piece of servo information is overwritten as in the conventional technique can be avoided. This can decrease the defect rate of products accompanying the destruction of the virtual circular orbit conversion data and lead to expansion of the life of products.

Next, a second embodiment will be described. In the first embodiment, the virtual circular orbit conversion data is stored only on the actual tracks of the disk. However, in the second embodiment, the virtual circular orbit conversion data is also stored in the flash ROM shown in FIG. 2. The block diagram of the recording apparatus shown in FIG. 2, the disk shown in FIG. 3, the virtual circular orbit conversion data shown in FIG. 4, the disk shown in FIG. 5 and the storage place of the virtual circular orbit conversion data shown in FIGS. 6 and 7 are also applied to the second embodiment.

In the recording apparatus in the second embodiment, at the start-up, first, reading out of the virtual circular orbit conversion data stored in the flash ROM 29 is tried. In the case where the read-out has been failed, the virtual circular orbit conversion data stored in the disk 2 is read out. The virtual circular orbit conversion data stored in the disk 2 is read out only when the reading out of the virtual circular orbit conversion data stored in the flash ROM 29 has been failed.

In the case where the reading out the virtual circular orbit conversion data from flash ROM 29 has been failed, the recording apparatus uses the virtual circular orbit conversion data stored in the disk 2 similarly to the first embodiment. Thereby, it is possible to realize multiplexing of the virtual circular orbit conversion data and speedup of the start-up processes.

Figure 9:
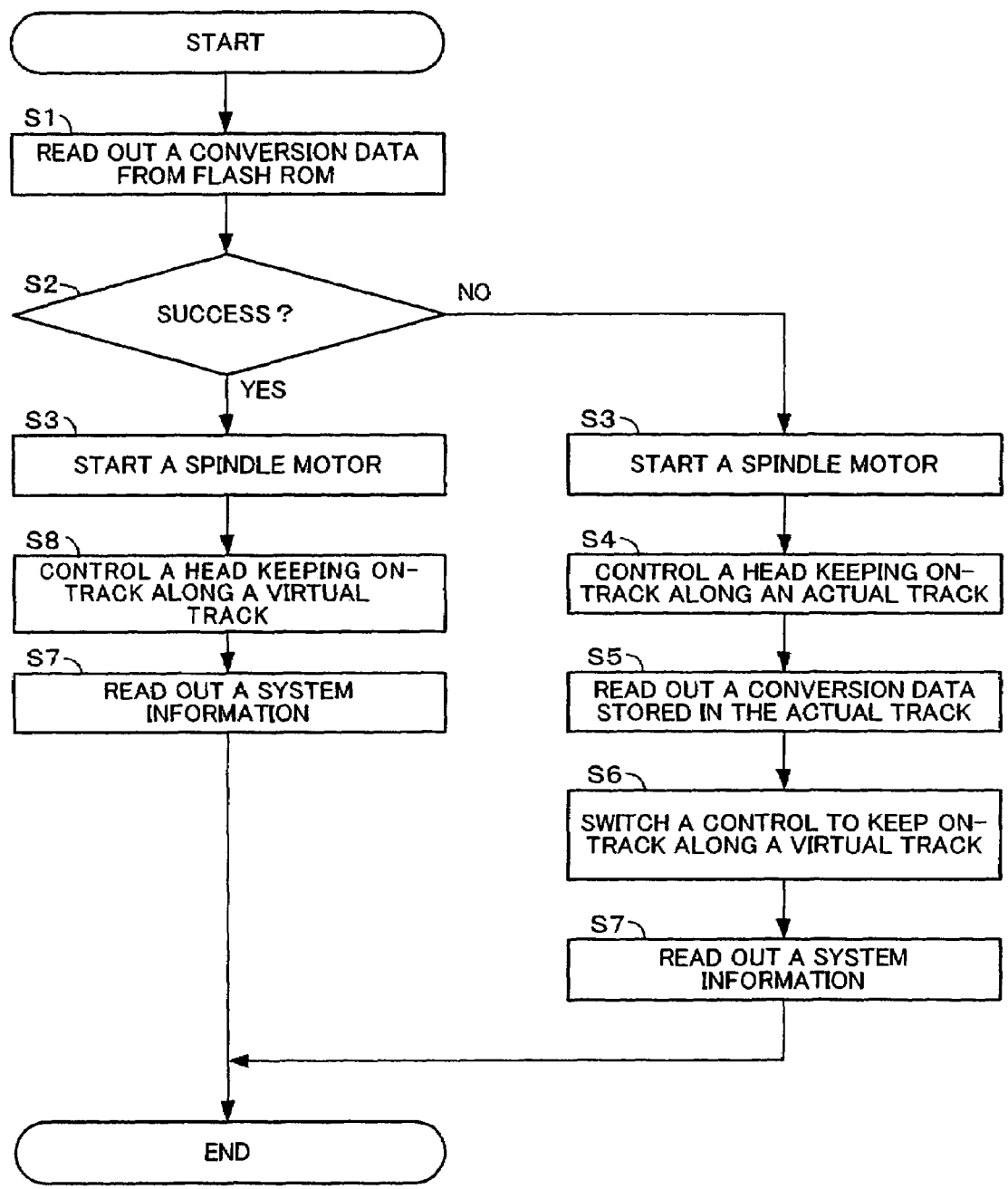
FIG. 9 is a flow chart illustrating processes at the start-up of a recording apparatus of a second embodiment.

FIG. 9 is a flow chart illustrating processes at the start-up of a recording apparatus of the second embodiment. When the virtual circular orbit conversion data stored in the flash ROM can have been read out, it is used and, only when it can not be read out, the virtual circular orbit conversion data stored in the actual tracks of the disk 2 is read out.

First, the virtual circular orbit conversion data is read out from the flash ROM (S1). The virtual circular orbit conversion data read out from the flash ROM is copied to the RAM 30. In the case where the virtual circular orbit conversion data can be read out from the flash ROM (Yes of Step S2), the rotation of the spindle motor is started (S3).

Then, the head is controlled along the virtual track defined by the virtual circular orbit conversion data (S8). In Step S8, the selector 27 is switched such that a signal from the virtual circular orbit correction unit 26 is inputted into the servo controller 22. The virtual circular orbit correction unit 26 converts information inputted from the position demodulation 25 into information of positions on the virtual tracks with the virtual circular orbit conversion data copied to the RAM 30 and inputs an instruction to the servo controller 22 that the head is on-track on the virtual tracks.

Since the data on the virtual tracks can be read and written due to Step S8, the system information stored in the system data area is read out and the recording apparatus is initialized (S7), the processes at the start-up are ended. Then, initialization is executed referring to para meter information and defect information stored in the system information.

In the case where the reading out of the virtual circular orbit conversion data from the flash ROM in Step S2 is failed, it is considered that, for example, the flash ROM has been destroyed. In this case, the on-track control along the virtual tracks is impossible. However, on-track control along the actual tracks defined by the servo information actually written is possible.

In the case where the virtual circular orbit conversion data can not be read out from the flash ROM in Step S2, after the rotation of the spindle motor has been started (S3), first, the control is switched to on-track control based on the actual tracks (S4).

Then, the virtual circular orbit conversion data stored on the actual tracks is read out (S5). Next, the control is switched by the selector such that the head is on-track controlled along the virtual circular orbit conversion data read out in Step S5 (S6). Then, the system information is read out from the system data area and the recording apparatus is initialized (S7) and the processes at the start-up are ended. The above process from Step S3 to Step S7 are same as those shown in FIG. 8 and the description for them is omitted.

Due to the start-up processes shown in FIG. 9, the virtual circular orbit conversion data is multiplexed even if the virtual circular orbit conversion data stored in the flash ROM is destroyed after the shipping of the recording apparatus. Therefore, it is possible to cause the head to follow the virtual tracks. This can decrease the defect rate of products accompanying the destruction of the virtual circular orbit conversion data and lead to expansion of the life of products. Furthermore, since the reading out of data from the flash ROM is speedier compared to the reading out from the disk, speedup of the processes at the start-up is possible.

Next, a third embodiment will be described. The block diagram of the recording apparatus shown in FIG. 2, the disk shown in FIG. 3, the virtual circular orbit conversion data shown in FIG. 4, the disk shown in FIG. 5 and the storage place of the virtual circular orbit conversion data shown in FIGS. 6 and 7 are also applied to the third embodiment. Though the virtual circular orbit conversion data is stored in the actual tracks on the disk and also in the flash ROM in the second embodiment, it is possible to further store the data in the virtual tracks on the disk. Thereby, it is possible to cope with replacing of the printed circuit board etc.

Figure 10:
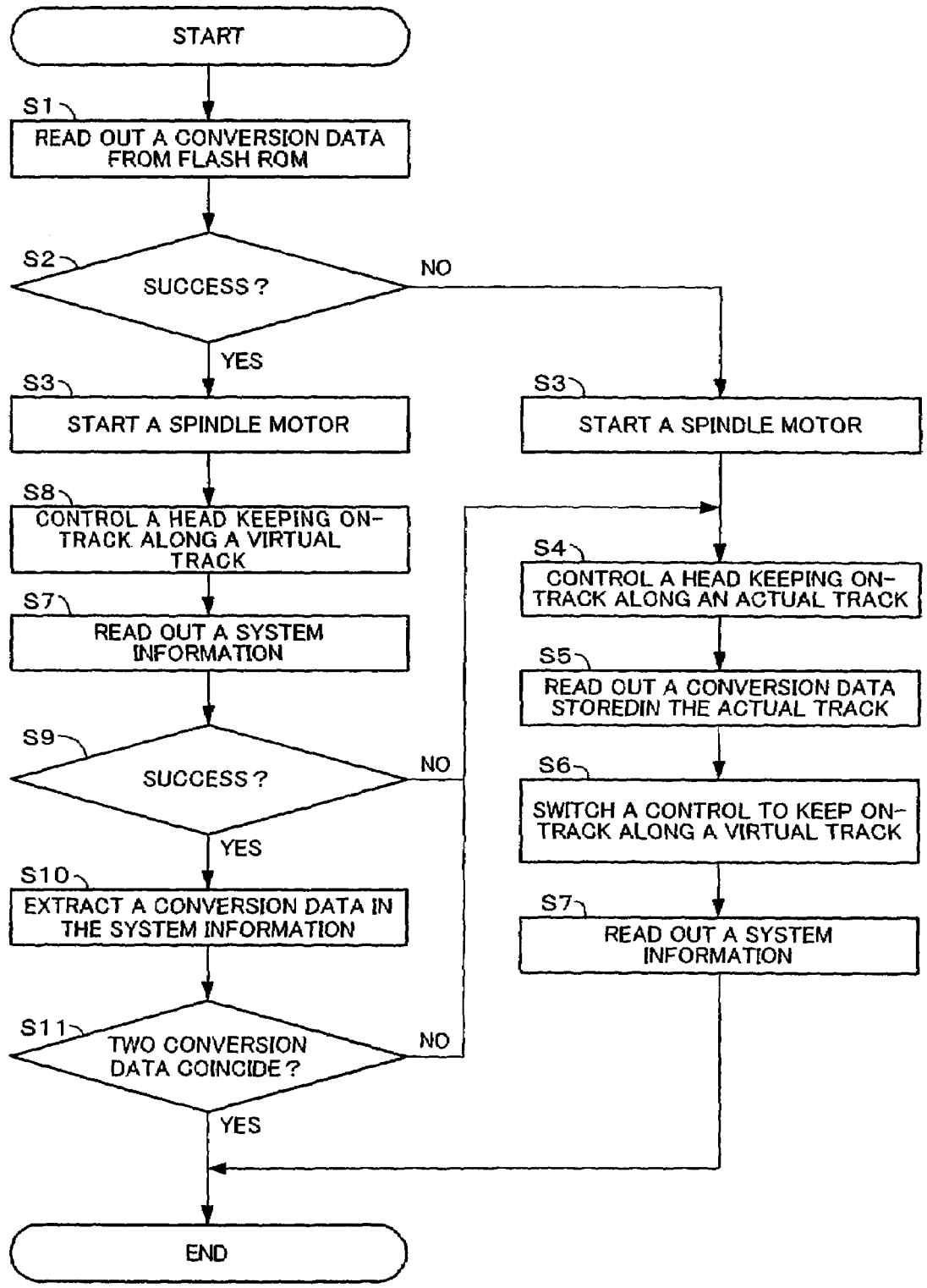
FIG. 10 is a flow chart illustrating processes at the start-up of a recording apparatus of the third embodiment.

FIG. 10 is a flow chart illustrating processes at the start-up of a recording apparatus of the third embodiment. In the third embodiment, the virtual circular orbit conversion data is stored also in the virtual tracks on the disk in addition to the virtual circular orbit conversion data stored in the flash ROM and in the actual tracks on the disk. The virtual circular orbit conversion data stored in the virtual track is included in the system information and it has been stored in the system information area 64 in advance.

First, the virtual circular orbit conversion data is read out from the flash ROM (S1). In the case where the virtual circular orbit conversion data can be read out from the flash ROM (Yes of Step S2), the rotation of the spindle motor is started (S3).

Then, the head is on-track controlled along the virtual tracks defined by the virtual circular orbit conversion data (S8). Since the data in the virtual tracks can be read and written due to Step S8, the system information stored in the system data area is read out (S7). In the system information, in addition to para meter information relating to the recording apparatus, the virtual circular orbit conversion data is stored in the case shown in FIG. 10. The above processes are same as those shown in FIG. 9 and the description for them is omitted.

In the case where reading out of system information is successful (Yes of Step S9), the virtual circular orbit conversion data contained in the system information is extracted (S10). In the case where extraction of the virtual circular orbit conversion data from the system information is successful, the virtual circular orbit conversion data read out in Step S1 and the virtual circular orbit conversion data extracted in Step S10 are compared to each other to determine whether they are same or not (S11). In the case where they are same in Step S11, the virtual circular orbit conversion data in the virtual track read out based on the virtual circular orbit conversion data stored in the flash ROM coincides and the virtual circular orbit conversion data read out from the flash ROM in Step S1 can be trusted. Therefore, the processes at the start-up are ended.

In the case where the virtual circular orbit conversion data can not be read out from the flash ROM in Step S2, and where the system information can not be read out in Step S9, and where the two conversion data is not same as a result of the comparison of them in Step 11 the virtual circular orbit conversion data stored in the actual tracks is used. When the rotation of the spindle motor has not yet started, after the rotation of the spindle motor has been started (S3), first, the control is switched to on-track control based on the actual tracks (S4).

Then, the virtual circular orbit conversion data stored in the actual tracks is read out (S5). Next, the control is switched by the selector such that the head is on-track controlled according to the virtual circular orbit conversion data read out in Step S5 (S6). Then, the system data is read out from the system data area and the recording apparatus is initialized (S7), and the processes at the start-up are ended. The above processes from Step S3 to Step S7 are same as those shown in FIG. 8 and the description for them is omitted.

The case where the reading out of the virtual circular orbit conversion data from the flash ROM is failed in Step S2 is the case where the flash ROM has been destroyed after the shipment of the recording apparatus. The case where the reading out of the virtual circular orbit conversion data from the flash ROM in Step S2 is successful, however, the reading out of the system information is failed in Step S9, is the case where the whole printed circuit board is replaced for some reason after the virtual circular orbit conversion data has been stored in the disk and the flash ROM.

The reading out of the virtual circular orbit conversion data from the flash ROM is successful in Step S2 and the reading out of the system information is also successful in Step S9, however, the two (2) pieces of the conversion data have been determined to be not same in Step S11, is the case where the printed circuit board has been replaced, and the correspondence tables of the part relating to the system data area 64 of both the virtual circular orbit conversion data recorded in a flash ROM of a new board and the virtual circular orbit conversion data stored in the system data of the disk happen to be same, however, they are not completely same. In any of the above cases, the on-track control along the actual tracks is possible. Furthermore, since the virtual circular orbit conversion data capable of being related to the virtual tracks set on the disk is always stored in the actual tracks, no problem can occur.

According to the processes at the start-up shown in FIG. 10, in addition to the two (2) places described referring to FIG. 9, replacement of the printed circuit board can be coped with by storing the virtual circular orbit conversion data also in the system information area, i.e., virtual tracks on the disk. In the processes at the start-up shown in FIG. 10, once the virtual circular orbit conversion data stored in the actual tracks on the disk can be readout, the head can be controlled along the virtual tracks.

Thereby, in addition to the effect by the processes described referring to FIG. 9, the disposition rate of the parts constituting the recording apparatus can be reduced by the processes described referring to FIG. 10. That is, it is possible to manufacture a new recording apparatus by combining a disk in the case where the printed circuit board has become defected after a recording apparatus has been manufactured, however, the disk in it is usable and a printed circuit board in the case where the disk has become defected after a recording apparatus has been manufactured, however, the printed circuit board in it is usable.

In this case, the virtual circular orbit conversion data stored in the flash ROM of the new recording apparatus and the virtual circular orbit conversion data stored in the disk are different. However, it is possible as a product to record the data along virtual tracks by executing the processes at the start-up shown in FIG. 10 and it is also possible to reduce the waste of parts caused by the defects after writing the virtual circular orbit conversion data into disks and flash ROMS.

According to the embodiments described above, the head can be on-track controlled on the virtual tracks even if the flash ROM has been destroyed or the printed circuit board has been replaced by storing the virtual circular orbit conversion data at two (2) places of the flash ROM and the actual tracks on the disk. Furthermore, by further having another virtual circular orbit conversion data in the system data area on the disk, the matching with data stored in the flash ROM can be determined more strictly and this leads to higher reliability of products.

Yet furthermore, data recorded as servo information for each sector in the prior art, can be clarified as a table data at the head and the management of the data can be easy. In the embodiments, only the case where tracks based on the actual servo information are decentered has been described. However, the embodiment can be applied to the case where tracks meander due to the vibration during write-in processes. That is, in this case, the virtual circular orbit conversion data shown in FIG. 4 is simply different. Therefore, the embodiment can be applied to the storage place of the conversion data and the processes at the start-up.

(Industrial Applicability)

According to the above-described embodiments, even when the center of written servo pattern is shifted from the rotation center, all the head can be controlled along concentric virtual tracks around the rotation center, operation stabilization time with switching among the heads can be reduced and the performance can be improved. Furthermore, multiplexing can be realized by having the conversion data for setting the virtual tracks, in both of a recording unit and a discoid record medium. Therefore, on-track control along the virtual tracks is possible by the conversion data on the discoid record medium even when, for example, the printed circuit board in a recording apparatus has been replaced.

The scope of the invention is not limited to the above embodiments but covers the inventions set forth in the appended claims and their equivalents.

What is claimed is:

1. A recording apparatus comprising:
   a discoid record medium;
   a head for writing or reading data to/from the discoid record medium;
   a rotation shaft for rotating the discoid record medium;
   a selector; and
   a control unit for controlling a position of the head, wherein
   servo information for determination of the head position is stored circularly in advance on the discoid record medium;
   the control unit reads position conversion information, which is stored in advance in a predetermined area on concentric orbits defined by the servo information on the discoid record medium;
   the selector selects servo information or position conversion information which is provided to the control unit;

when the position conversion information is selected, the control unit controls the head based on the position conversion information so that the head follows a virtual track of which center is the rotation center of the discoid record medium, the virtual track being different from the track determined by the servo information;

the predetermined area on the concentric orbits defined by the servo information is an area from which the position conversion information can be read out even when data has been written along the concentric orbits of which center is the rotation shaft, and is an area on which a user cannot overwrite any data; and at a start-up of the recording apparatus, the control unit reads out the position conversion information and controls the head based on the read out position conversion information or servo information.

2. The recording apparatus according to claim 1, wherein the recording apparatus further has a memory unit in which the position conversion information is stored, wherein the control unit stores the position conversion information in a predetermined area on the concentric orbits which center is the rotation shaft, and wherein the control unit determines whether or not a first position conversion information stored in the memory unit can be read out at the start-up and, when the first position conversion information can be read out, reads out a second position conversion information stored in the predetermined area on the concentric orbits which center is the rotation shaft by controlling the head based on the read out first position conversion information, compares the first position conversion information and the second position conversion information with each other, and when they do not coincide with each other as a result of the comparison, first, switches a control such that the head is controlled along the concentric orbits defined by the servo information and reads out a third position conversion information stored in the predetermined area on the concentric orbits defined by the servo information and, then, switches again the control such that the head is controlled based on the read out third position conversion information.

3. The recording apparatus according to claim 2, wherein the predetermined area on the concentric orbits defined by the servo information in which the third position conversion information is stored is an area on the concentric orbits determined by the servo information, from which data can be read out even when data have been written along the concentric orbits which center is the rotation shaft.

4. The recording apparatus according to claim 3, wherein the concentric orbits defined by the servo information are further circumferentially divided into a plurality of sectors, and wherein the predetermined area of the concentric orbits defined by the servo information, in which the third position conversion information is stored, is a part of the plurality of sectors.

5. The recording apparatus comprising:
a discoid record medium;
a head for writing or reading data to/from the discoid record medium;
a rotation shaft for rotating the discoid record medium; and
a control unit for controlling a position of the head, wherein servo information for determination of the head position is stored circularly in advance on the discoid record medium;

the control unit reads position conversion information, which is stored in advance in a predetermined area on concentric orbits defined by the servo information on the discoid record medium;

the control unit controls the head based on the position conversion information so that the head follows a virtual track of which center is the rotation center of the discoid record medium, the virtual track being different from the track determined by the servo information;

the predetermined area on the concentric orbits defined by the servo information is an area from which the position conversion information can be read out even when data has been written along the concentric orbits of which center is the rotation shaft, and is an area on which a user cannot overwrite any data; and at a start-up of the recording apparatus, the control unit reads out the position conversion information and controls the head based on the read out position conversion information, wherein the recording apparatus further comprises a memory unit in which the position conversion information is stored, and wherein the control unit determines whether or not a first position conversion information stored in the memory unit can be read out at the start-up and, when the first position conversion information can be read out, controls the head based on the read out first position conversion information and, when the first position conversion information can not be read out, first, reads out a second position conversion information stored in the predetermined area on the concentric orbits defined by the servo information by controlling the head along the concentric orbits defined by the servo information, then, selects a control such that the head is controlled based on the read out second position conversion information.

6. The recording apparatus according to claim 5, wherein the concentric orbits defined by the servo information are further circumferentially divided into a plurality of sectors, and wherein the predetermined area of the orbits, in which the second position conversion information is stored, is a part of the plurality of sectors.

7. A method of starting up a recording apparatus having a discoid record medium on which is recorded servo information locating a position of a head, wherein position conversion information, based on which the head is controlled so that the head follows a virtual track of which center is the rotation center of the discoid record medium, is stored in advance in a predetermined area on concentric orbits defined by the servo information on said discoid record medium, the virtual track being different from the track determined by the servo information;

the position conversion information or servo information is selected;

the predetermined area on the concentric orbits defined by the servo information is an area from which the position conversion information can be read out even when data has been written along the concentric orbits of which center is the rotation shaft, and is an area on which a user cannot overwrite any data;

at a start-up of the recording apparatus, the position conversion information is read out; and the head is controlled based on the selected read out position conversion information or servo information.

8. A method of starting up a recording apparatus having a discoid record medium on which is recorded servo information locating a position of a head, wherein position conversion information, based on which the head is controlled so that the head follows a virtual track of which center is the rotation center of the discoid record medium, is stored in advance in a predetermined area on concentric orbits defined by the servo information on said discoid record medium, the virtual track being different from the track determined by the servo information;

the predetermined area on the concentric orbits defined by the servo information is an area from which the position conversion information can be read out even when data has been written along the concentric orbits of which center is the rotation shaft, and is an area on which a user cannot overwrite any data;

at a start-up of the recording apparatus, the position conversion information is read out; and the head is controlled based on the read out position conversion information, wherein the recording apparatus further has a memory unit in which the position conversion information is stored, wherein whether or not a first position conversion information stored in the memory unit can be read out is determined, wherein when the first position conversion information can be read out, the head is controlled based on the read out first position conversion information, and wherein when the first position conversion information can not be read out, first, a second position conversion information stored in the predetermined area on the concentric orbits defined by the servo information is read out by controlling the head along the concentric orbits defined by the servo information, then, a control is switched such that the head is controlled based on the read out second position conversion information.

9. A method of starting up a recording apparatus having a discoid record medium on which is recorded servo information locating a position of a head, wherein position conversion information, based on which the head is controlled so that the head follows a virtual track of which center is the rotation center of the discoid record medium, is stored in advance in a predetermined area on concentric orbits defined by the servo information on said discoid record medium, the virtual track being different from the track determined by the servo information;

the predetermined area on the concentric orbits defined by the servo information is an area from which the position conversion information can be read out even when data has been written along the concentric orbits of which center is the rotation shaft, and is an area on which a user cannot overwrite any data;

at a start-up of the recording apparatus, the position conversion information is read out; and the head is controlled based on the read out position conversion information, wherein the recording apparatus further has a memory unit in which the position conversion information is stored, wherein the position conversion information is further stored in advance in a predetermined area on the concentric orbits which center is the rotation shaft, wherein whether or not a first position conversion information stored in the memory unit can be read out is determined at the start-up of the recording apparatus, wherein when the first position conversion information can be read out, the head is controlled based on the read out first position conversion information, wherein a second position conversion information stored in the predetermined area on the concentric orbits which center is the rotation shaft is read out, wherein the first position conversion information and the second position conversion information is compared with each other, wherein when they do not coincide with each other as a result of the comparison, first, a third position conversion information stored in the predetermined area on the concentric orbits defined by the servo information is read out by switching a control such that the head is controlled along the concentric orbits defined by the servo information, and wherein the control is switched again such that the head is controlled based on the read out third position conversion information.

10. A recording apparatus comprising:

a discoid record medium;

a head for writing or reading data to/from the discoid record medium;

a rotation shaft for rotating the discoid record medium;

a selector; and a control unit for controlling a position of the head, wherein servo information for determination of the head position is stored circularly in advance on the discoid record medium;

the control unit reads a plurality of pieces of position conversion information, which is stored in advance in a predetermined area on concentric orbits defined by the servo information on the discoid record medium;

the selector selects servo information on position conversion information which is provided to the control unit;

when the position conversion information is selected, the control unit controls the head based on the position conversion information so that the head follows a virtual track of which center is the rotation center of the discoid record medium, the virtual track being different from the track determined by the servo information;

the predetermined area on the concentric orbits defined by the servo information being an area from which at least one of the pieces of the position conversion information can be read out even when data has been written along the concentric orbits of which the center is the rotation shaft, and being an area on which a user cannot overwrite any data; and at a start-up of the recording apparatus, the control unit reads out the position conversion information and controls the head based on the read out position conversion information.

* * * * *